United States Patent [19]

Discenza et al.

[11] Patent Number: 5,300,933
[45] Date of Patent: Apr. 5, 1994

[54] STICK FIGURE RADAR TRACKING PROCESS

[75] Inventors: Joseph H. Discenza, Poquoson; C. Allen Butler, Hampton, both of Va.

[73] Assignee: Daniel H. Wagner Associates, Inc., Hampton, Va.

[21] Appl. No.: 21,661

[22] Filed: Feb. 24, 1993

[51] Int. Cl.⁵ .............................. G01S 13/91
[52] U.S. Cl. ............................ 342/36; 342/96; 342/179
[58] Field of Search ............ 342/29, 36, 96, 179

[56] References Cited

U.S. PATENT DOCUMENTS

| | | | |
|---|---|---|---|
| 3,623,090 | 11/1971 | Gilbert | 342/37 X |
| 3,747,097 | 7/1973 | Howard | 342/179 X |
| 3,870,994 | 3/1975 | McCormick | 342/37 X |
| 3,872,474 | 3/1975 | Levine | 342/36 |
| 4,179,695 | 12/1979 | Levine | 342/37 |
| 4,197,536 | 4/1980 | Levine | 342/37 |
| 4,213,126 | 7/1980 | Mulder et al. | 342/36 |
| 4,319,243 | 3/1982 | Vachenauer | 342/37 |
| 4,516,125 | 5/1985 | Schwab | 342/36 |
| 4,719,467 | 1/1988 | Voles | 342/179 |
| 5,075,680 | 12/1991 | Dobbs | 342/36 X |
| 5,189,425 | 2/1993 | Dabbs | 342/36 X |

Primary Examiner—T. H. Tubbesing
Attorney, Agent, or Firm—Wallace J. Nelson

[57] ABSTRACT

A process for reducing the likelihood of runway incursions wherein the major components of an aircraft are individually tracked by radar instead of tracking only the overall image of the aircraft to more accurately predict possible runway incursions due to the rapid and accurate indication of any change in aircraft orientation during each sweep of the radar.

7 Claims, 6 Drawing Sheets

STICK FIGURE RADAR TRACKING PROCESS

FIELD OF THE INVENTION

This invention relates generally to radar tracking of ground traffic at an airport and relates specifically to a radar tracking process involving a stick figure tracker technique to accurately detect and rapidly determine directional changes in movement of ground traffic at an airport.

BACKGROUND OF THE INVENTION

It is recognized that the most dangerous of conditions at an airport is where there is danger of high speed collision involving an aircraft landing or taking off. This condition is called a runway incursion (RI) which, by definition is "any occurrence at an airport involving an aircraft, vehicle, or person on the ground that creates a collision hazard or results in loss of separation with an aircraft taking off, intending to take off, landing, or intending to land." The frequency of these RIs has been increasing in recent years, along with the increased traffic load at airports. Although the incidences are still relatively rare, they are still very dangerous and collisions have occured with disastrous results in terms of injuries, loss of life and property.

There is a continuous effort by the Federal Aviation Administration (FAA), as well as by individuals and private companies, to improve airport safety and enhance the performance of air traffic controllers at United States airports. The primary safety mission of air traffic controllers is to prevent runway incursions. Runway incursions occur when aircraft or other vehicles enter a runway on which an aircraft has been cleared for landing or take off. A primary goal of the FAA initiative is to be able to automatically detect the occurrence of a runway incursion, and alert the responsible air traffic controller. Ideally, the safety system would automatically predict when a runway incursion is imminent and generate an alert prior to the intrusion.

The primary radar for surveillance and monitoring the movement of airport ground or surface traffic, is a special purpose, high-resolution surface radar known as the Airport Surface Detection Equipment (ASDE-3) radar. The ASDE-3 radar employs frequency agility and circular polarization to achieve significant improvement in aircraft detection during adverse weather conditions. The 60 revolution per minute digitally scan converted radar provides a display to a range of 5.5 kilometers, with a range resolution of approximately 3.7 meters and an azimuth beamwidth of 0.25 degrees.

Because of the ratio of target size to radar range, a jetliner can return energy in a very large number of range and bearing sample bins. Moreover, because of differences in reflectivity, the target may actually appear in the data as two or more smaller returns rather than one large one. In some cases, the radar image may look very much like the plan view of the aircraft itself, while, in others it may not.

The current method of tracking in the Airport Movement Area Safety System (AMASS) program involves detecting a region of greater radar return in the $(\rho,\phi)$ of the radar signal and then computing a centroid from all the reflected energy of the target. That centroid location is then tracked using an Alpha-Beta tracker. Because different components of the aircraft can reflect energy differently, depending on aspect, the radar can miss portions of the aircraft on any one sweep. This can cause the centroid to exhibit significant jumps, which tends to confuse the tracker, especially during aircraft turns. This phenomena might result in the erroneous generation of an alert if the tracker output were being used to predict runway incursions. Such false alarms tend to limit the usefulness of the system and degrade the confidence of the user. Targets such as trucks, buses, and smaller aircraft that have smaller radar cross-sections do not exhibit the kinds of tracking anomalies produced by large jets.

It is an object of the present invention to provide an improved radar tracking system that reduces the likelihood of runway intrusions.

Another object of the present invention is a process of detecting and tracking the components of an aircraft rather than its center.

Another object of the present invention is a radar tracking system combining images from several aircraft components rather than from the aircraft center alone.

A further object of the present invention is a stick-figure tracker employing radar data extraction to measure the range and bearing of various individual aircraft components and tracking each individual component separately.

An additional object of the present invention is a data extraction process that measures the range and bearing of each tracked aircraft component and predicts the precise locations of critical aircraft physical components to give instantaneous information of any change in aircraft bearing between radar sweeps.

SUMMARY OF THE INVENTION

According to the present invention the foregoing and additional objects are attained by providing a Stick-Figure model of an aircraft such that individual elements of the radar returns of a large jetliner can be distinguished, depending on the configuration of the individual aircraft type and radar aspect angle. The term individual elements or components as used herein is intended to include the aircraft nose, tail, wings and fuselage. By modifying the data extraction process to measure the range and bearing of each aircraft component, each of these components can be tracked individually. The separate component images are computer combined to estimate the true center and orientation of the aircraft and predict the precise locations of critical physical components (e.g. wingtips, nose and tail). To accomplish this, the composite tracker needs a geometric definition of the relationships of the radar components to one another and to the geometry of the aircraft itself. The defined geometry is called "Stick-Figure" and includes separate images of the aircraft nose, fuselage, right wing, left wing and tail. These images combine to produce a "stick-figure" of the aircraft that is displayed on the radar screen with, or without, an overlay of the suspected aircraft type to give instantaneous indication of the aircraft orientation and any change therein from a previous observation.

BRIEF DESCRIPTION OF THE DRAWINGS

A more complete appreciation of the invention and many of the attendant advantages thereof will be better understood when considered in connection with the accompanying drawings wherein.

DETAILED DESCRIPTION

Figure 1:
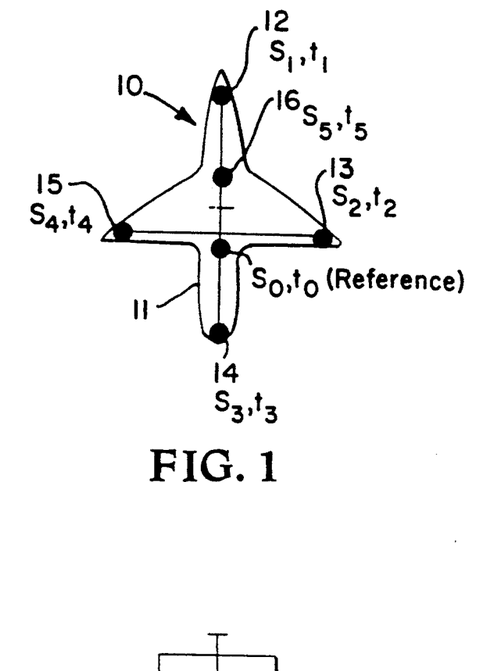
FIG. 1 is a schematic representation of the stick figure geometry of a jet liner, shown as an overlay thereon, according to the present invention.
Figure 1A:
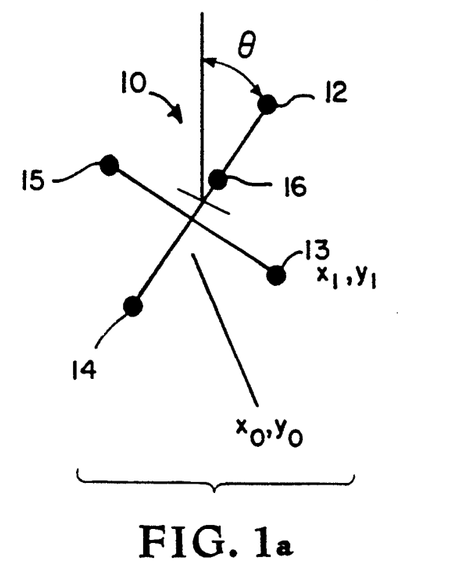
FIG. 1a is a schematic representation of the stick figure five component aircraft model shown in FIG. 1, turned at an angle $\theta$, and without the overlay of the jet liner.

Referring now to the drawings and more particularly to FIGS. 1 and 1a, the radar stick figure of the present invention is represented by the five connected dots shown and designated generally by reference numeral 10. An overlay of a jet aircraft 11 is disposed over stick figure 10. These five connected dots are measured from an arbitrary point ($s_o$, $t_o$) in the aircraft geometry and are labeled $s_1,t_1$; $s_2,t_2$; $s_3,t_3$; $s_4,t_4$; and $s_5,t_5$ representing, respectively, the centroid of the aircraft nose, right wing, tail, left wing and fuselage. These components are further designated, respectively, in the drawings by reference numerals 12, 13, 14, 15, and 16. In the examples described herein, the consistent arbitrary reference point ($s_o,t_o$) chosen for measuring the distance for different components in the aircraft configurations was the point on the centerline between the aft most points on the wings tips. If a set of component measurements, or radar centroids, are observed at $x_i$, $y_i$, (FIG. 1a) i=1 .. . m≦5, then the least squares estimate of the center ($x_o,y_o$) and the clockwise orientation angle $\theta$) of the aircraft are obtained as follows: First, it is observed that $$x_i = x_o + s_i \cos\theta + t_i \sin\theta$$

$$y_i = y_o + t_i \cos\theta - s_i \sin\theta.$$

If we rearrange terms and add an error term, we get a set of similar equations in the unknowns, $x_o$, $y_o$, $\sin\theta$, and $\cos\theta$, $$x_i = x_o + s_i \cos\theta + t_i \sin\theta + \epsilon(x_i)$$

$$y_i = y_o + t_i \cos\theta - s_i \sin\theta + \epsilon(y_i)$$

If at least two components are observed, then there are at least four equations in four unknown and the unknowns can be estimated by standard linear regression. Let $Y = (x_1 y_1\ x_2 y_2\ \ldots\ x_n y_n)$ and $X = [(1,0,s_1,t_1), (0,1,t_1,-s_1),\ \ldots\ (1,0,s_n,t_n),\ (0,1,t_n,-s_n)]$ and $\epsilon = (\epsilon(x_1), \epsilon(y_1), \ldots, \epsilon(x_n), \epsilon(y_n))$.

Also let $\beta = (x_o, y_o, \sin\theta, \cos\theta)$. Then the equations in matrix form become the canonical multiple regression model, $$Y = X\beta + \epsilon \qquad (1)$$

with the solution for the least squares estimate,
$\hat{\beta} = (X^T X)^{-1} X^T Y$.

In practice, a weighted least square (WLS) technique is used utilizing the total radar energy from each component, $w_i$.

If W is the diagonal matrix whose ith diagonal entry is $w_i^2$, then the optimal weighted least squares estimate is given by $$\hat{\beta} = (X^T W X)^{-1} X^T W Y. \qquad (2)$$

The component images are radar components and are not identical to aircraft components, because many factors, including aspect angle, external and internal metallic content, and the skin shape, contribute to the configuration of reflections. For example, in the forward-quarter view of the DC-9 aircraft, as will be further described hereinafter, the nose provides a strong return which is very distinct from the fuselage. This phenomenon may be enhanced by the reflection of radar energy from the boundary bulkhead and equipment between cockpit and cabin. Under this hypothesis, radar energy penetrates the large windows of the cockpit, and is reflected by the more substantial and irregular metallic objects inside. It is also obvious that the wings are relatively poor radar reflectors, due to their edge-on aspect in most instances.

Thus, the first step in using the "stick-figure" image approach is to determine which portions of the radar energy belong to which components of the aircraft. The return profiles of several aircraft in the FAA radar data sample and a DC-9 at an aspect angle of 293° was chosen for the specific examples described hereinafter. Aspect angle is measured clockwise from the forward direction of the aircraft to the line of sight of the radar. It is then the relative direction of the radar from the aircraft (Aspect angle = bearing from radar-heading + 180°).

Figure 2:
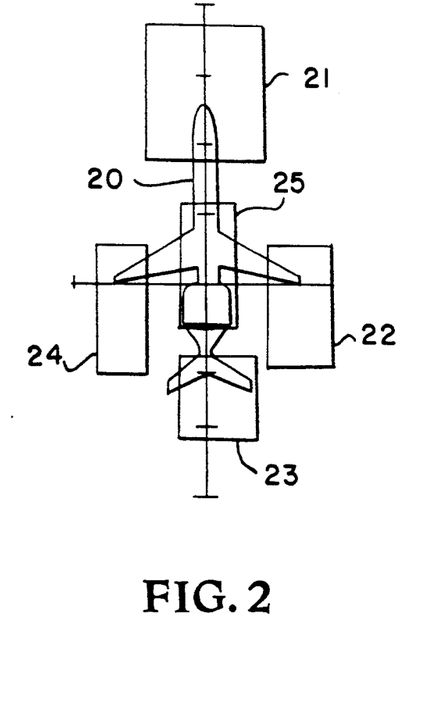
FIG. 2 is a schematic diagram of the component capture windows for a DC-9 sample data set.

Through inspection of the data obtained by this process, five rectangular regions corresponding to these energy distributions may be created. As illustrated in FIG. 2, a plan view 20 of a DC-9 aircraft is shown having five rectangular areas superimposed thereon. These five rectangles are designated by reference numerals 21, 22, 23, 24, and 25 and, respectively, represent the aircraft nose, right wing, tail, left wing and fuselage. Rectangles 21, 22, 23, 24 and 25 are adjusted to permit the algorithm to be able to capture and centroid the aircraft components within these windows, even if the aircraft is not exactly at this exact aspect angle.

These windows are used to partition the radar returns from the aircraft into individual components and in order to apply these windows, it is necessary to center and align them on the centroid of the aircraft using its direction. The Stick-Figure tracker of the present invention can compute direction, either using a simple regression technique or, by the last observed direction. There is an ambiguity of 180° in the regression calculation, but this ambiguity is easily resolved based on the direction from which the aircraft entered the observation window. The centroid location is always determined using a simple center of mass technique.

Figure 3:
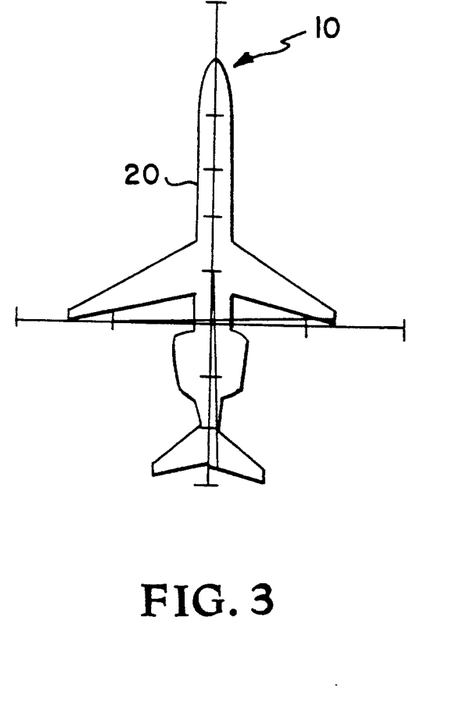
FIG. 3 is a schematic illustration of a stick-figure model geometry of a DC-9 aircraft, superimposed on a plan view of the aircraft, according to the present invention.

Referring to FIG. 3, the stick figure geometry 10 of a DC-9 aircraft 20 is illustrated as superimposed on a plan view of the aircraft. The data points depicted in FIG. 3 are obtained by using the windows obtained from calculation of a set of component centroids for nine specific scans of data. The average of these centroids gives a stick figure for this aircraft and aspect angle. The stick figure coordinates (in meters) thus obtained are:

|  | $s_i$ | $t_i$ |
| --- | --- | --- |
| Nose | 0.19 | 26.11 |
| Right Wing | 12.78 | 0.66 |
| Tail | 1.29 | −12.55 |
| Left Wing | −13.67 | −0.25 |
| Fuselage | 0.39 | −0.08 |

The data employed in the specific examples described herein was obtained from the FAA and consisted of seven MS-DOS format floppy disks containing X data files. This data was recorded at Pittsburgh Airport on May 8, 1991 using the ADAS (ASDE-3 Data Acquisition System) The ADAS system collects digitized radar data in a range and azimuth window that can remain fixed or move. For the purposes of these illustrative examples only the data from fixed windows was examined because it is simpler to reduce the ground clutter. The archived data represent digitized samples of the radar return, with a sampling rate of 42 MHz. Azimuth is measured in pulse pairs because the return values from every other pulse are summed during the signal processing. Thus, a transmitter PRF of 16,384 per second yields 8,192 azimuth samples per second which, at ASDE-3 antenna rotation rate of 60 RPM, means 8,192 azimuth samples per revolution.

The data obtained from FAA represents two sampling intervals totaling about two hours, fifteen minutes and contain data from approximately thirty aircraft during landings, takeoffs, and some runway crossing. For the example herein only a single aircraft type (DC-9) and only a small number of events (three) were tracked.

Figure 4:
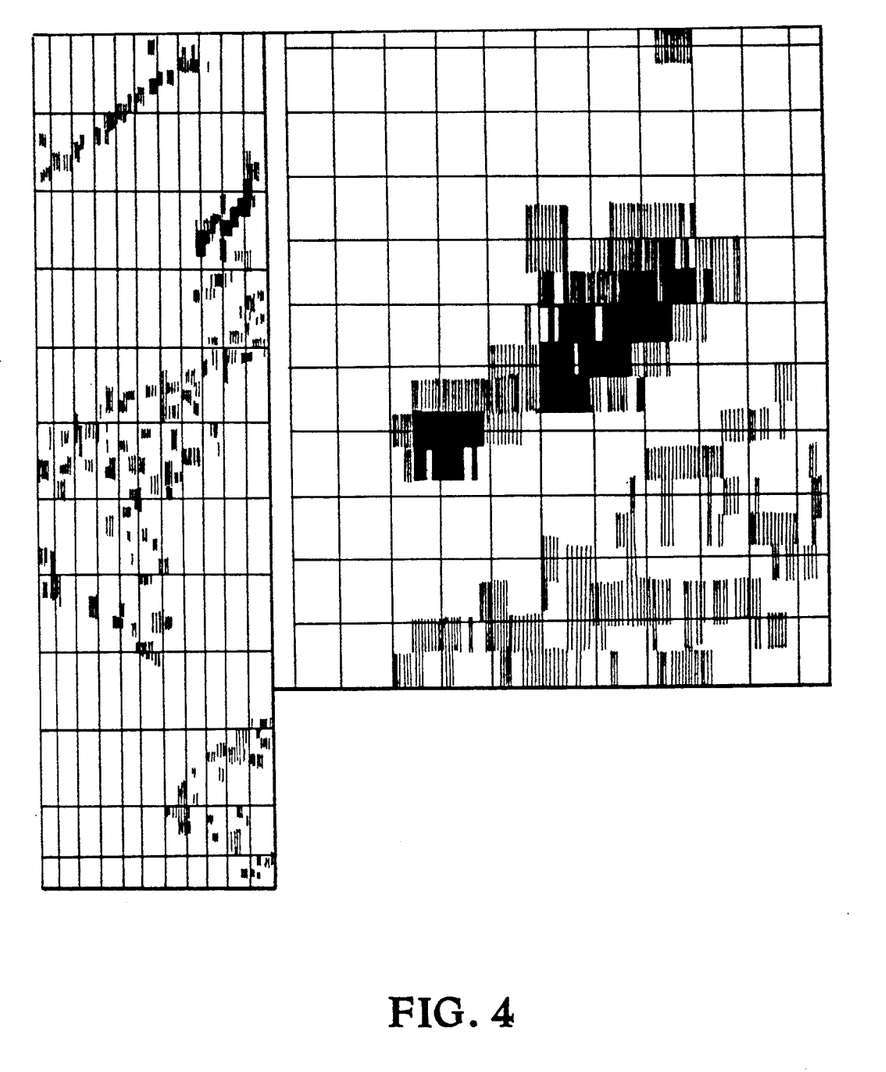
FIG. 4 is a schematic illustration of a radar screen showing part of a normal radar view screen in the left portion thereof and illustrating the application of clutter reduction and target window centroiding in the enlarged overlay right portion thereof.

In order to extract the returns from any aircraft within the field of view, elementary background clutter reduction must be applied. In the examples herein, this was accomplished by time averaging the radar signal intensity in each range/bearing bin over the time frame within which the field of view was fixed. This average intensity represents the returns from the background clutter within the radar window. A single frame of data illustrating clutter reduction and target window centroiding is shown in FIG. 4. This is a range bearing plot with the radar intensities for each range/bearing bin converted to a gray scale wherein the darker the rectangle the stronger the return. In order to reduce the clutter, each data set was modified by subtracting the average intensity values prior to the next processing step. This elementary technique was sufficient to enable the detection of aircraft as they entered the field of view. In actual practice, a filtered course and speed would be employed to provide an initial search area for the new location of the target at each scan.

Detection of an aircraft is declared whenever the total radar intensity for the entire window exceeds a certain threshold. When this occurs the centroid of the entire window is computed. This centroid is usually near the target, but can be off center due to the returns from background clutter (the clutter is reduced, but not entirely eliminated). A new centroid is then computed based on the radar intensities within a small window, called the "target window", centered at the first centroid. The size of the target window used in this study (approximately 75 meters by 75 meters) was determined from the radar returns for the three scenarios under analysis. This second centroid (FIG. 4) represents an estimate of the center of the aircraft and is the "observation" that is fed into both the Kalman filter tracker and the Alpha-Beta tracker.

The next step is to generate an estimate for the orientation of the aircraft. Working only within the target window, the range centroid of each azimuth which contains radar intensities exceeding a certain threshold is computed. A least squares algorithm is then applied to determine the orientation of the line through the range centroids. Using this orientation together with the target centroid, the range/bearing bins that lie within the rectangular component boxes computed for this target type and aspect are determined. A centroid for the radar intensities within each box is then computed. These centroids, together with the total intensity associated with each component, are then processed with a least squares algorithm against the stick figure as computed for this scenario. The resulting center and orientation are the output of the Stick-Figure tracker as shown by the overlay of the DC-9 outline shown in FIG. 5.

Figure 5:
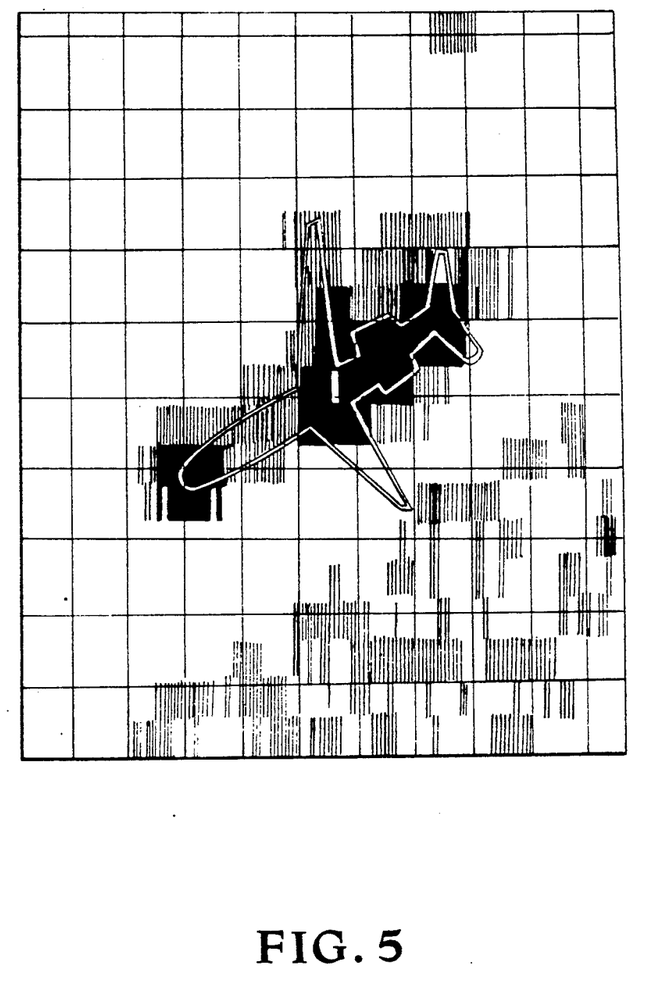
FIG. 5 is a view similar to FIG. 4 and provided with an overlay of the DC-9 aircraft being observed on the centroided portion shown.

The first of the three different scenarios employed to demonstrate the improvement of the Stick-Figure tracker over the presently employed tracker systems involved a field of view, or window, centered at a location 819 meters and 53 degrees (true) from the control tower and contained an area of approximately 160 meters (in azimuth) by 378 meters (range). Although the data was collected over a twenty-one minute time period, the DC-9 aircraft observed lay entirely within the field of view of only thirteen seconds. The aircraft entered the window from the southeastern part of the run-up pad and traveled along the pad on a course of approximately 300 degrees. A single frame of this data is shown in FIG. 5 with an overlay outline of a DC-9 aircraft being shown therein.

Figure 6:
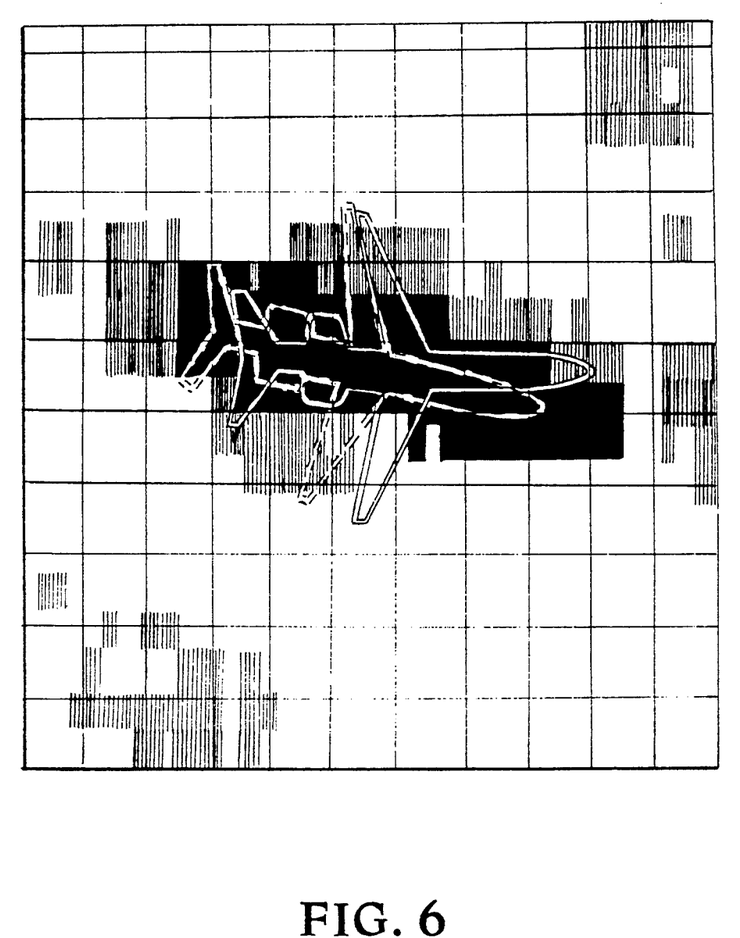
FIG. 6 is a combined view similar to FIG. 5 and illustrating the comparison of information detected from the stick figure model of the present invention with that received from the Alpha-Beta and Kalman filter radar tracking algorithms.

The second scenario window included the take-off area for a runway and was centered approximately 1347 meters at 104 degrees from the control tower and covered an area of approximately 385 meters (in azimuth) and 378 meters (in range). The time period for this data set was six minutes and six seconds while the aircraft proceeded laterally across the window and turned to align itself with the runway in preparation for take-off. A single frame of this data is illustrated in FIG. 6 with the original path of the aircraft being shown in the solid line overlay and the turned position shown in the dotted line overlay of the aircraft.

Figure 7:
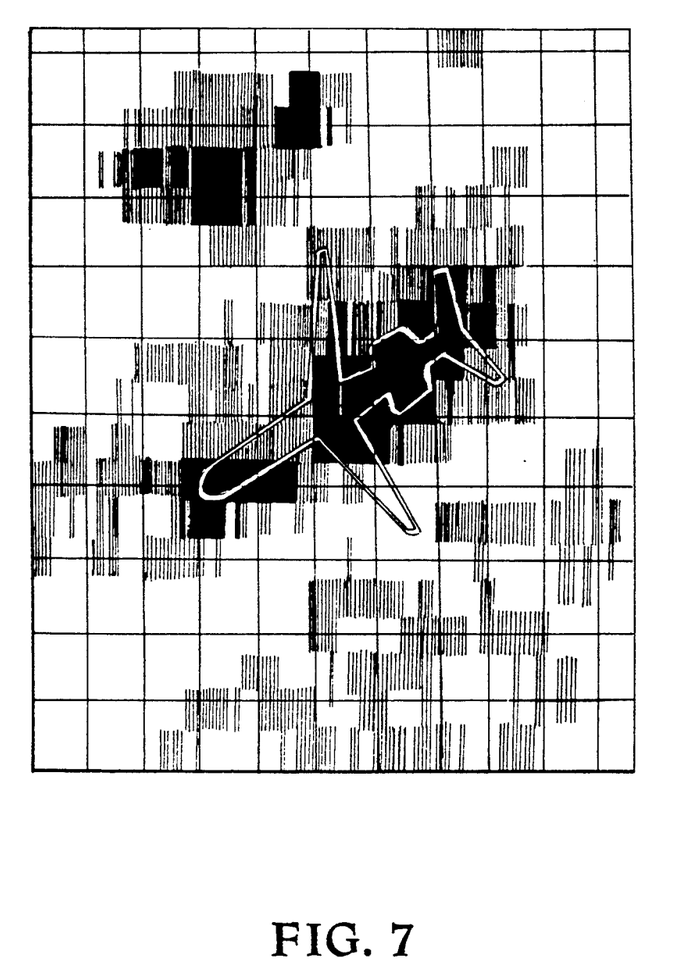
FIG. 7 is a schematic illustration of a radar screen centroided target window overlay depicting a stick figure model tracker in the form of a DC-9 aircraft when passing a stationary smaller aircraft on the ground.

The third scenario was designed to illustrate the ability of the stick-figure tracker to distinguish small and large aircraft. This scenario was fabricated by combining the data sets for the first scenario described above with a third data set showing a small aircraft on the run-up pad lined up for take-off. By extracting the radar data from a small window centered at the small aircraft and then "overlaying" this data on each frame of data employed in the first scenario, a simulation of a DC-9 passing close to a small aircraft was obtained. A single frame of the generated data thus obtained is shown in FIG. 7.

The first scenario provides an opportunity to compare the tracking capability of the Alpha-Beta tracker, the Kalman filter tracker and the Stick-Figure tracker of the present invention. Because the run-up pad within this window is parallel to 300 degrees, it is known that the aircraft heading should also be approximately 300 degrees and that the aircraft will be following a straight line course. Applying the least squares regression to the (x,y) output of the trackers, the estimated track heading for each tracker is as follows: Alpha-Beta 299.04; Kalman 299.01 and Stick-Figure 299.05, which is consistent with the geometry of this field of view. The tracker output and the mean heading computed by each tracker differs only slightly from the least squares computed heading.

When the data points are rotated so as to align the data with each tracker's straight line estimate, the standard deviation of each tracker's output relative to the cross-track component of the positions may be computed. A regression against time for the "y" coordinate then gives an estimate of the down track standard deviation.

The error in the cross-track estimates is an order of magnitude smaller than the down-track estimates. The accuracy of these results is consistent with the geometry of this scenario. First, the orientation of the aircraft is such that the down track measurements are along the major axis of the aircraft. The centroiding technique is clearly less accurate along the center line of the aircraft than perpendicular to it. As a result, the observations are more accurate in the cross-track direction than the down-track direction. Furthermore, the estimation of the down-track variation comes from a least squares fit between the down-track coordinate and time, which assumes that the aircraft is traveling at a constant speed, and which may not be entirely correct.

For this scenario, it appears that the Alpha-Beta and Kalman trackers produced smoother output than the Stick-Figure tracker. In particular, the cross-track standard deviations are smaller and the mean headings produced by the tracker are closer to the straight-line estimates and have smaller standard deviations. This is due, in part, to the fact that the aircraft in this scenario is following a straight track or constant course. Since the motion models for both the Alpha-Beta and Kalman trackers assume a constant course they are going to produce nearly optimal results for this scenario. On the other hand, the Stick-Figure tracker produces errors on the same order of magnitude as the other trackers, even though the Stick-Figure tracker output has not been filtered.

When the results of the second scenario are examined, the power of the Stick-Figure tracker becomes obvious. In this scenario, the aircraft is turning in preparation for take-off. As the aircraft begins its turn, the Alpha-Beta and Kalman trackers form their state estimate by averaging the observed position (the centroid) and the estimated position which was obtained by extrapolating the previous position in a straight line along the previous course estimate. The result is a new course estimate that is closer to the actual heading, but still lies several degrees counter-clockwise to the actual heading of the aircraft. On the other hand, the Stick-Figure tracker is able to provide a much more accurate estimate of the current heading based solely upon the most recent scan of data, as illustrated in FIG. 6.

In this FIG. the output of the Stick-Figure tracker closely follows the apparent orientation of the radar returns, while the output of the other two trackers are so closely related as to be practically indistinguishable and overlay one another. The key difference is that any algorithm based on using only the centroids and a straight-line motion model will lag behind several seconds as an aircraft makes a turn. It follows that the Stick-Figure tracker has the ability to predict an imminent runway incursion whereas the Alpha-Beta and Kalman trackers would detect the incursion only after it had occurred.

Another problem with a tracker that uses only the centroids to estimate aircraft position is the ability of the tracker to distinguish between large and small aircraft that are within close proximity of one another. In the third scenario, a large aircraft passing by a small stationary aircraft is simulated (FIG. 7). As the large aircraft passes by the smaller one the centroid is pulled to one side by the radar return from the small aircraft, resulting in a misestimate of both the position and heading by the Alpha-Beta and Kalman trackers. The Stick-Figure tracker is able to use the orientation of the aircraft, together with the component centroiding, to maintain an accurate track of the larger aircraft.

Figure 8:
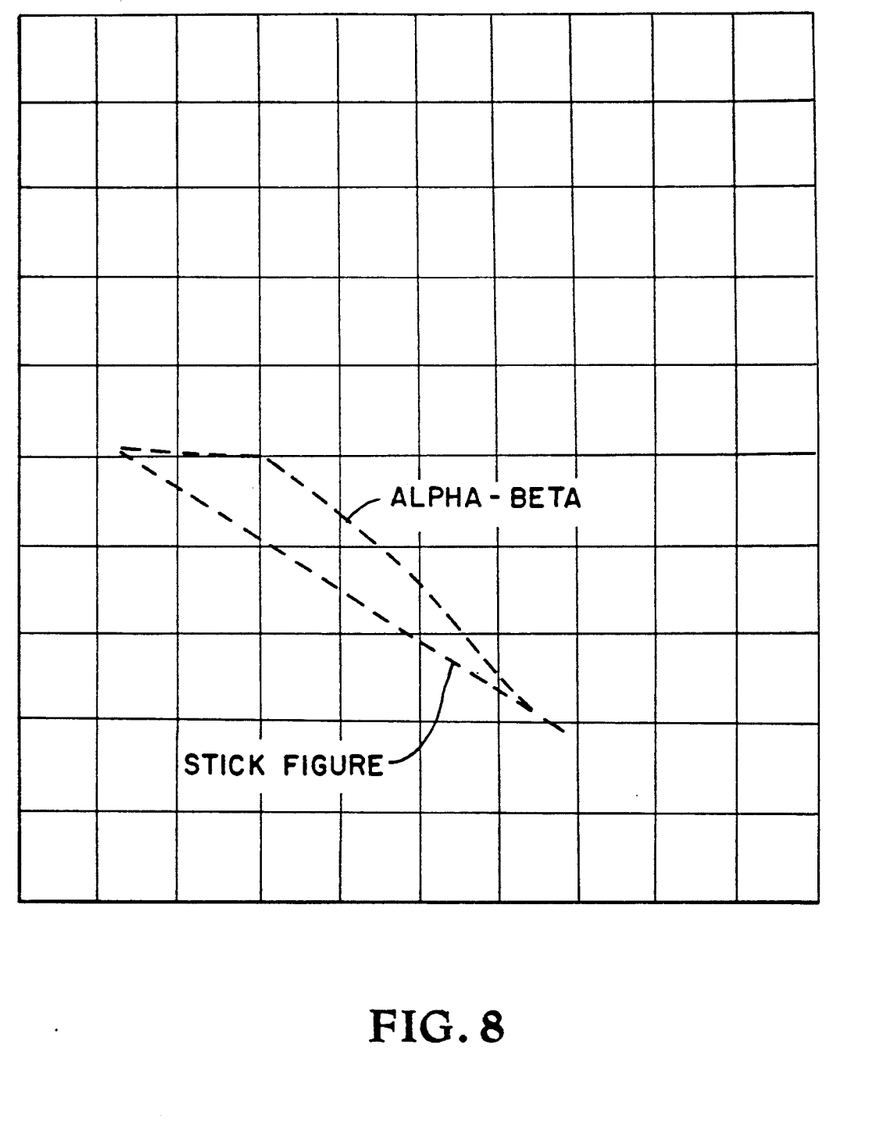
FIG. 8 is a graphical illustration of the x,y output from the stick figure tracker of the present invention compared with the Alpha-Beta tracker for the scenario illustrated in FIG. 7.

FIG. 8 illustrates a (x,y) plot showing a comparison of the position output of the Alpha-Beta tracker and the Stick-Figure tracker for scenario three. As shown therein the track produced by the Alpha-Beta tracker is curved with the curvature being a direct result of the presence of the stationary small aircraft passed by the larger DC-9. The maximum position deviation of the Alpha-Beta track from the true track is approximately fifteen meters.

A timing study using both the SUN3 and SUN4 workstations was performed to determine whether or not the Stick Figure tracker could be used as a real time tracker for the Airport surface tracking problem. Specifically, the Stick Figure tracking technique was employed to time the calculation of the center and orientation of an aircraft.

For the examples described herein the following assumptions were made:

(1) The center and an initial estimate of aircraft orientation are provided by another tracker or based on the previous state estimates from the Stick Figure tracker.

(2) For each range/bearing bin the corresponding (x,y) coordinate has been precomputed. The (x,y) coordinates are needed to determine if a given range/bearing bin is within one of the component windows. There are a total of 12,288,000 range/bearing bins (8192 bearings times 1500 ranges), but the (x,y) coordinate can be precomputed for each one.

(3) The computation of the least squares solution is done using a fixed weight matrix. In the current implementation of the prototype Stick Figure tracker, the least squares problem is solved by computing the inverse of the positive semi-definite matrix $(X^T W X)$ and then calculating the matrix product with the matrix of component centroids Y. The solution is given by the equation described hereinbefore, $\hat{\beta}=(X^TWX)^{-1}X^TWY$. The matrix X comes from values that are precomputed for the given aircraft, range and aspect angle (this is the "stick figure"). The weights come from the total radar intensity in each component window. However, if it is assumed that the relative weights of each component window are typically the same for this aircraft and geometry, then these weights may be precomputed and the entire matrix multiplicand $(X^T W X)^{-1} X^T W$ needed to solve the equation may be computed.

(4) The aircraft being tracked is "near" the radar. This is a worse case assumption. The target window is currently set at 75 meters by 75 meters. The aircraft centroid input for the timing test is approximately 600 meters in range. This results in a target window whose dimensions are 125 azimuth bins by 23 range bins. For an aircraft at a range of 1200 meters, the number of azimuth bins would be reduced by roughly one-half.

(5) Every range/bearing bin has non-zero radar intensity. Again this is a worse case scenario, in that every range/bearing bin within the target window must be tested for containment in the component windows. For the data sets provided by the FAA and employed herein, more than 60 percent of the range/bearing bins have zero radar intensity and would not require any processing.

Given these assumptions, an outline of the processing required to obtain the center and orientation of the aircraft involves (a) Using the input centroid, determine the boundaries (in azimuth bins k and range bins j) of the target window;

(b) Calculate the sine and cosine of the input orientation;

(c) For each range/bearing bin in the target window having non-zero intensity, perform the following steps (i) use the sine and cosine values calculated above to rotate the (x,y) coordinate by the input orientation, (ii) test to see if the rotated coordinate is within one of the component windows (Nose, Right Wing, Tail, Left Wing, Fuselage), (iii) if the rotated coordinate is within one of the component windows, cumulate the total radar intensity and cumulate the product of the intensity and each coordinate;

(d) For each component, divide by the total radar intensity to obtain the coordinates of the centroid;

(e) Solve the normal equations by multiplying the $4 \times 10$ solution matrix times the $10 \times 1$ matrix of component centroids; and (f) Obtain the orientation by applying the arctangent function to the last two coordinates of the least squares solution vector.

It is thus seen that the Stick Figure tracker can discern position and orientation of a large jet from its ASDE-3 radar return using standard mathematical and statistical techniques. The processing required to do so involves a series of six centroiding operations (one for the entire target and one for each of the five components) and applying a weighted least squares technique to the resulting centroids. This type of processing can be performed very efficiently and preliminary timing study indicates that a SUN4 workstation could perform this function in approximately 0.05 second. It is therefore seen that the extra processing required to perform this high-accuracy tracking on a moderate number of aircraft is feasible using affordable computers.

The foregoing results also demonstrate that the Stick-Figure tracker, combined with a simple course and speed smoother, will provide an accurate and smooth track of the aircraft. Also, since the tracker finds a defined centerpoint for every different aircraft type, it will be able to predict the location of key physical components (nose, wing tips, tail) as shown in the schematic drawings of actual radar images.

All standard tracking techniques depend on the measurement of position differences between observations to estimate velocity. Unfortunately, aircraft taxiing on an airport surface are moving slowly and can change their directions suddenly. This means that an unexpected turn by an aircraft into a dangerous situation might not be predicted by standard tracking techniques. Thus, AMASS warnings will in many cases only indicate a dangerous situation after it has already occurred. With the Stick-Figure tracking of the present invention, changes in aircraft heading can be detected within one radar sweep. Projections based on these heading estimates are therefore much more accurate than those based on position-difference data and can be used for advanced warning in many situations.

In addition to tracking radar returns, the Stick-Figure tracker can also be used to incorporate kinematic and attribute data from other sensors. For instance, future airport safety plans being considered include the implementation of cooperative aircraft location and identification by time-difference multilateration of received signals from beacons known as "Squitters". These are spontaneous, one-per-second transmissions from Mode S beacons. An array of receiver antennas positioned around the airport could determine positions from these signals for purpose of identification. The accuracy of this position determination method is an order of mangnitude better than comparaticle with radar accuracies. Therefore, given that the position of the beacon antenna relative to the aircraft is known, such a signal could be incorporated directly into the Stick-Figure tracker model. This would provide additional tracking accuracy and identification data tags for output, decision aiding, and display. The appropriate weights for use of this data would be determined in the weighted least squares equations, based on the expected position error covariance of such external observations.

By measuring and combining the range and bearing of each of several aircraft components, it is thus seen that the Stick-Figure tracker of the present invention provides instantaneous information of any change in aircraft bearing between radar sweeps to thereby more accurately predict possible runway incursions before they occur.

Although the invention has been described relative to specific aircraft and to specific embodiments thereof, it is not so limited. The Stick-Figure tracker, as described, may be employed with any type aircraft and there are numerous variations and modifications of the invention that will be readily apparent to those skilled in the art in the light of the above teachings.

It is therefore to be understood that, within the scope of the appended claims, the invention may be practiced other than as specifically described herein.

What is claimed as new and desired to be secured by Letters Patent of the United States is:

1. An improved method for radar tracking of ground traffic at an airport to reduce the occurrence of runway incursions, comprising the steps of:

employing a radar system to continuously sweep an airport area and detect individual major components of individual fixed and moving objects within the sweep area on and adjacent to a specific runway;

combining and centroiding the images from several individual aircraft components detected to provide an estimate of the true center and orientation of the aircraft and to form a stick-figure tracker for the aircraft being observed;

identifying the aircraft observed by comparing the stick figure tracker obtained with known stick figure trackers for the type aircraft suspected in the area;

measuring the range and bearing of the individual aircraft components; and tracking each individual component in the stick figure tracker to thereby indicate and predict the precise relative location of critical aircraft physical components and give instantaneous information of any change in aircraft bearing between radar sweeps.

2. The method of claim 1 wherein the steps of combining and centroiding the images from the several individual aircraft components includes the steps of:

measuring the components of the radar stick figure defined by $s_i, t_i$, relative to a point $s_o, t_o$, on the centerline between the aft-most points on the aircraft image wingtips using a set of component radar centroid measurements $x_i, y_i$, (where i=1 ..., m≤5);

computer determining the least squares estimate of the center $(x_o, y_o)$ and the clockwise orientation angle $\theta$ of the stick figure by observing $$x_i = x_o + s_i \cos\theta + t_i \sin\theta$$

$$y_i = y_o + t_i \cos\theta - s_i \sin\theta$$

adding an error term and computer solving to yield a set of similar equations for the unknowns, $x_o, y_o, \sin\theta$, and $\cos\theta$ wherein, $$x_i = x_o + s_i \cos\theta + t_i \sin\theta + \epsilon(x_i)$$

$$y_i = y_o + t_i \cos\theta - s_i \sin\theta + \epsilon(y_i)$$

estimating the unknowns by linear regress wherein, $$Y = (x_1, y_1\ x_2, y_2 \ldots x_n, y_n)$$

$$X = [(1,0,s_1,t_1), (0,1,t_1,-s_1), \ldots (1,0,s_n,t_n), (0,1,t_n,-s_n)]$$

$$\epsilon = (\epsilon(x_1), \epsilon(y_1), \ldots, \epsilon(x_n), \epsilon(y_n))$$

$$\beta = (x_o, y_o, \sin\theta, \cos\theta);$$

changing the equations to matrix form to become the canonical multiple regression model $$Y = X\beta + \epsilon$$

with the solution for the least squares estimate being $$\hat{\beta} = (X^T X)^{-1} X^T Y$$

and the weighted least square solution, using the total radar energy $(w_i)$ from each component wherein W is the diagonal matrix whose ith diagonal entry is $w_i^2$, to give the optimal least squares estimate equation $$\hat{\beta} = (X^T W X)^{-1} X^T W Y.$$

3. An improved method of radar tracking of ground traffic at or near an airport runway to reduce the likelihood of runway incursions, comprising the steps of:

providing a radar system for observing a specific area of an airport;

sweeping the specific airport area observed periodically by the radar system;

employing a data extraction process in the radar system to detect the major individual components of any aircraft within the observed specific area; and computer combining the separate major individual component images to provide an estimate of the true center and orientation of the aircraft observed and to predict the precise locations of the critical physical components of the aircraft.

4. The method of claim 3 including the steps of:

displaying the combined component images on the radar screen according to the geometric relationship of the detected component parts to each other and to the geometry of the aircraft observed to thereby produce a stick figure image of the aircraft;

providing an overlay plan view outline of the suspected aircraft on the radar screen over the stick figure image being viewed; and employing the stick figure image and overlay to provide instantaneous indication of the aircraft orientation and any change therein from a previous radar sweep observation.

5. The method of claim 3 wherein the step of employing a data extraction process in the radar system to detect the major individual components of the aircraft includes the steps of detecting individual images of the aircraft nose, right wing, tail, left wing and fuselage.

6. The method of claim 3 wherein the step of computer combining of the separate major individual component images includes the step of centroiding each individual component image and reducing the impact of any radar induced clutter on the radar screen.

7. The method of claim 3 wherein the estimate of the aircraft true center and clockwise orientation thereof are computer obtained by a weighted least squares process employing the optimal weighted least squares estimate formula:

$$\hat{\beta} = (X^T W X)^{-1} X^T W Y.$$

where
   W is the diagonal matrix whose ith diagonal entry is $W_i^2$,
   X is $[(1,0,s_1,t_1), (0,1,t_1,-s_1), \ldots (1,0,s_n,t_n), (0,1,t_n,-s_n)]$
   $X^T$ is the mathematical transpose of X, and,
   Y is $(x_1, y_1\ x_2, y_2 \ldots x_n, y_n)$

* * * * *